UNITED STATES PATENT OFFICE.

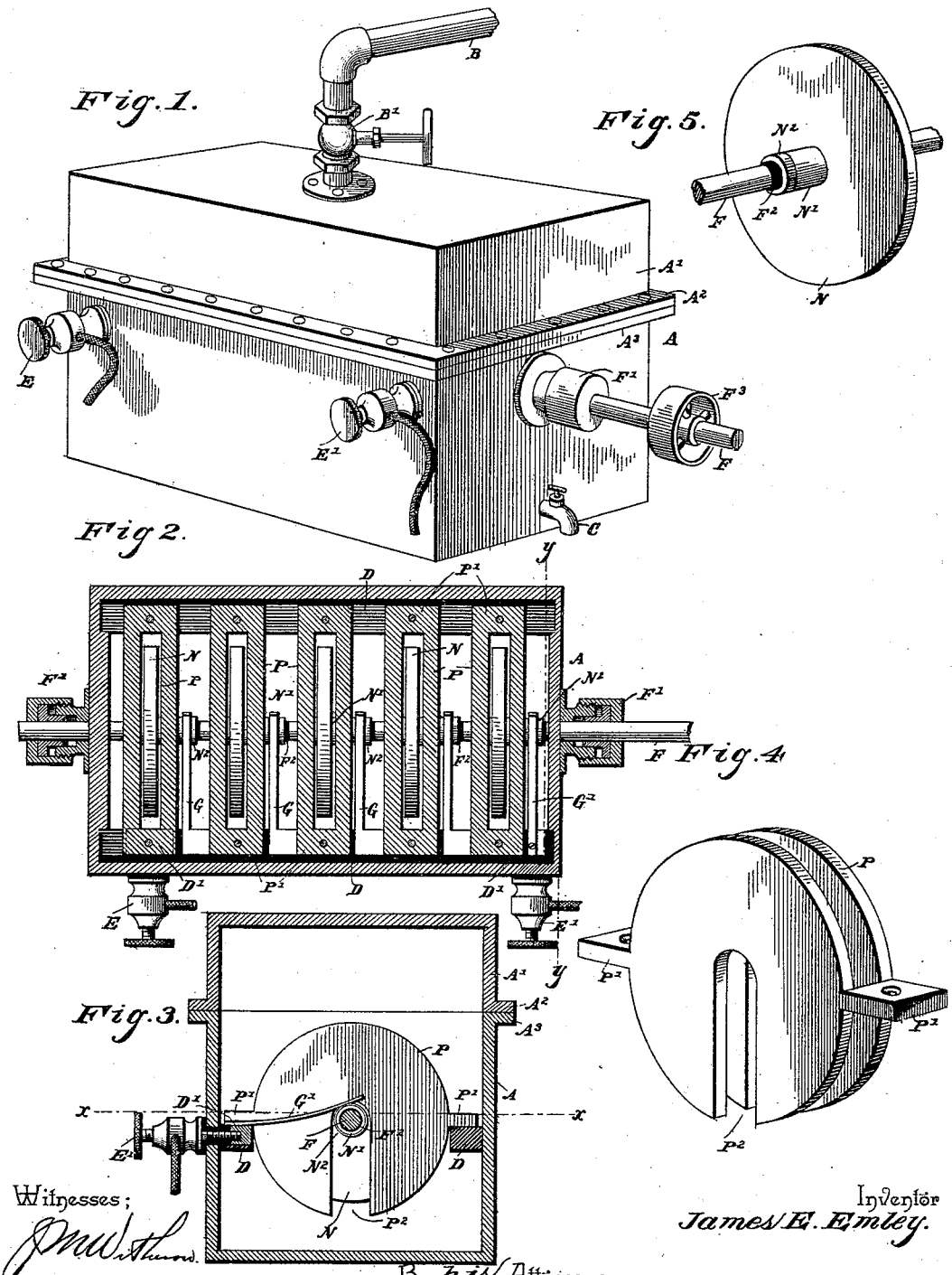

JAMES EDWARD EMLEY, OF LAREDO, TEXAS.

ELECTRIC BATTERY.

SPECIFICATION forming part of Letters Patent No. 473,386, dated April 19, 1892.

Application filed January 27, 1891. Serial No. 379,289. (No model.)

*To all whom it may concern:*

Be it known that I, JAMES EDWARD EMLEY, a citizen of the United States, residing at Laredo, in the county of Webb and State of Texas, have invented a new and useful Electricity Generator, of which the following is a specification.

This invention relates to electric batteries; and it consists of the mechanism illustrated in the accompanying drawings, the peculiar construction, combination, and arrangement of which will be hereinafter fully described, and the points of novelty particularly pointed out in the claims.

In the drawings, Figure 1 is a perspective view of a battery constructed in accordance with my invention. Fig. 2 is a horizontal sectional view taken on the line $x\ x$ of Fig. 3. Fig. 3 is a transverse sectional view on the line $y\ y$ of Fig. 2. Fig. 4 is a perspective view of the cathode, and Fig. 5 is a similar view of the anode.

A designates a steam-chest or suitable receptacle for steam, arranged so that access may be had to the interior thereof in any convenient manner—as, for instance, by means of a top A′, which is flanged, as at A², and adapted to be bolted down upon a similar flange A³ on the lower part of the receptacle A, making a steam-tight joint therewith. A steam-pipe B enters the top A′ and is provided with a valve B′ for the inlet of steam, the pipe B being connected with a steam-generator. A cock C is provided in the lower part of the steam-receptacle to draw off the water formed by condensation of steam.

Within the receptacle A are arranged two strips of insulating material D D, which are arranged longitudinally and horizontally along the sides of the said receptacle and suitably secured thereto. A piece of conducting material D′ is embedded in one of the strips D, near each end thereof, and connected in any suitable manner with the binding-posts E E′, which latter are insulated from the side of the receptacle A. The cathodes P (one of which is shown in Fig. 4) are each formed of two parallel disks held together by the lugs P′, which extend from their edges at diametrically-opposite points, and the disks are further provided with radial slots P², extending from their centers to their edges. The cathodes may be made of carbon, copper, or other suitable material, and may be cast integral, as shown, or may be formed of two disks suitably secured together. The anodes N are disks of zinc or other suitable material provided with a central opening, around which is formed a collar or boss N′.

A shaft F extends longitudinally through the steam-receptacle A and is journaled in packing-boxes F′, secured to the ends of the receptacle, and the anodes N are mounted upon the said shaft F by passing the latter through the central opening in the said anodes. An insulation F² is placed around the shaft F within the collar N′ of the disk N, thus insulating the disk from the shaft. The shaft F extends through the ends of the steam-receptacle A, and has upon one end thereof a pulley F³, to which may be connected a suitable motor to revolve the said shaft F and the negative electrodes N within the receptacle. The cathodes P are placed over the anodes N, the slots P² thereof being wide enough to pass over the collars N′ and leave sufficient space around the said collars to prevent electrical connection between the positive and negative elements. The lugs P′ of the cathodes rest upon the strips of insulating material D, to which they are secured by bolts or other suitable fastening. The position of the electrodes are, as shown in Fig. 2, with one anode N between, but out of contact with, the two parallel disks of each cathode P, and the cathodes are supported upon the strips of insulating material D. The collar N′ of each anode is long enough to extend outside of the cathode, and has a contact-surface which may be a ring of suitable metal N², upon which the free end of a brush G is adapted to rest to carry off the electric current from the anode. The brushes G are supported upon one of the strips D, and when the battery is connected in series each brush, except the brush G′ at the end of the battery, is connected with the cathode of the pair next succeeding the pair to which it makes contact with the anode thereof, thus the negative of one pair is electrically connected to the positive of the next. The brush G′, which makes contact with the anode of the pair at one end, is connected to one of the conducting-pieces D′, which is connected with the binding-post E′ to form the negative pole of the battery, and the cathode of the pair at the opposite end is connected to the other piece D', which is connected to the binding-post E, forming the positive pole of the battery, as clearly illustrated in Fig. 2. It will be obvious that if it is required to connect the pairs for "quantity" the cathodes may all be connected together and their current carried to the positive pole, and the brushes from the anodes may also be connected together and carried to the negative pole, or part of the pairs may be connected for quantity and part in series, as will be readily understood.

In operation the steam-receptacle is closed, with the electrodes properly connected therein, and steam under suitable pressure is admitted thereto through the pipe B. The oxygen and hydrogen of the steam will act upon the elements of the battery to produce a current of electricity, which, when the poles of the battery are connected by a conductor, will flow from the positive to the negative and thus establish a current of electricity in the said conductor.

In order to increase the efficiency of the battery and prevent polarization, suitable motive power is applied to the pulley $F^3$ on the end of the shaft F to rotate the said shaft and the anodes N between the disks of the cathodes P, while the steam is acting upon the said disks under suitable pressure.

It will be understood that I do not wish to limit myself to the precise details of construction herein illustrated and described, as many modifications may be made therein without departing from the spirit of the invention.

Having thus described my invention, what I claim, and desire to secure by Letters Patent, is—

1. In an electric generator, a receptacle for steam, and means for admitting steam thereto, in combination with electrodes consisting of two parallel disks suspended within said steam-receptacle, electrodes of opposite polarity to the aforesaid electrodes arranged between the disks of the first-named electrodes, a shaft extending through the said receptacle upon which the latter electrodes are mounted, and means for rotating the said shaft, substantially as described.

2. In an electric battery, an electrode formed of two disks arranged parallel with each other and suitably secured together, an electrode of opposite polarity, consisting of a disk mounted upon a shaft and arranged to rotate between the disks of the first-named electrode, means for rotating said shaft, and means for conducting the electricity from the electrodes, substantially as described.

In testimony that I claim the foregoing as my own I have hereto affixed my signature in presence of two witnesses.

JAMES EDWARD EMLEY.

Witnesses:
S. PARKS,
C. W. GRIBBLE.